A. I. Lenhart,
Fish Hook.
No. 70,868.  Patented Nov. 12. 1867.
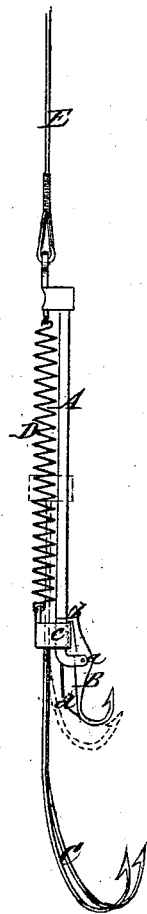
Witnesses.  Inventor:

United States Patent Office.

ADAM I. LENHART, OF NEW BRUNSWICK, NEW JERSEY.

Letters Patent No. 70,868, dated November 12, 1867.

IMPROVED FISH-HOOK.

*The Schedule referred to in these Letters Patent and making part of the same.*

TO ALL WHOM IT MAY CONCERN:

Be it known that I, A. I. LENHART, of New Brunswick, in the county of Middlesex, and State of New Jersey, have invented a new and improved Fish-Hook; and I do hereby declare that the following is a full, clear, and exact description thereof, which will enable others skilled in the art to make and use the same, reference being had to the accompanying drawing, and to the letters of reference marked thereon.

This invention relates to a new and improved fish-hook of that class which are provided with a spring, a catch, or fastening, and one or more supplemental hooks, which, when the fish seizes the bait, are released and sprung, so as to penetrate the fish and secure it.

The invention consists in a novel construction of the device or the arrangement of the parts, whereby the capture of the fish when the latter nibbles or seizes the bait is rendered almost certain.

The accompanying drawing represents a side view of my invention.

A is a bar, the lower end of which is curved, and has a hook, B, attached by a pivot, $a$, the shank of the hook above the pivot being provided with a shoulder, $b$, to catch over a slide, $c$, on the bar A, the latter having a spring, $d$, at its lower end, which bears against the hook at its lower part, and has a tendency to keep the shoulder $b$ over the slide $c$, as clearly shown in the drawing. To the slide $c$ one or more hooks C are attached. These hooks, C, like the hook B, are of the regular fish-hook form, but the former, C, are larger than the latter, B. The slide $c$ is connected by a spiral spring, D, with the upper part of the bar A, and this spring has a tendency to keep the hook or hooks C quite close up to the hook B, as shown in red in Figure 1. The fish-line E is attached to the upper end of the bar A.

The bait is put on the hook B, and the hook or hooks C are drawn down until the slide $c$ reaches the lower end of the bar A, when the shoulder $b$ of the hook B catches over it and holds it in that position. A fish in seizing the bait on hook B liberates the slide $c$, and the spring D instantly draws the hook or hooks C upward, so that the latter will penetrate the fish at the under side of the mouth or jaw and effectually hold it.

Having thus described my invention, I claim as new, and desire to secure by Letters Patent—

The hook B, pivoted to the bar A, provided with the shoulder $b$, and having the spring $d$ bearing against it, in connection with the slide $c$, having the spring D attached, and the hook or hooks C, all arranged substantially as and for the purpose set forth.

The above specification of my invention signed by me this 7th day of September, 1867.

A. I. LENHART.

Witnesses:
 WM. F. MCNAMARA,
 J. A. SERVICE.